United States Patent [19]

Baba et al.

[11] Patent Number: 5,120,566
[45] Date of Patent: Jun. 9, 1992

[54] PROCESS FOR PRODUCING WATER-CONTAINING CHOCOLATE

[75] Inventors: Hideki Baba, Sennan; Yoshiko Kamuro, Izumi; Yohichi Tashiro, Kitasoma, all of Japan

[73] Assignee: Fuji Oil Company, Limited, Osaka, Japan

[21] Appl. No.: 608,524

[22] Filed: Nov. 2, 1990

[30] Foreign Application Priority Data

Nov. 10, 1989 [JP] Japan ................................. 1-293037
Aug. 24, 1990 [JP] Japan ................................. 2-223593

[51] Int. Cl.$^5$ ............................................. A23G 1/00
[52] U.S. Cl. ..................................... 426/631; 426/633
[58] Field of Search ............... 426/602, 604, 613, 631, 426/633, 306, 100, 101, 632

[56] References Cited

U.S. PATENT DOCUMENTS 2,760,867  8/1956  Kempf .
3,223,532  12/1965 Pinkalla et al. .
3,232,765  2/1966  Rosenthal .
3,914,458  10/1975 Terada et al. ........................ 426/604
4,446,166  5/1984  Giddey ................................. 426/631

FOREIGN PATENT DOCUMENTS 0033718  8/1981  European Pat. Off. .
393327   10/1990 European Pat. Off. .
3129892  6/1982  Fed. Rep. of Germany .
405908   7/1966  France .
409603   10/1966 France .
152467   9/1983  Japan .
59-59149  4/1984  Japan .
59-71643  4/1984  Japan .
60-27339  2/1985  Japan .................... 426/631
60-27339  2/1985  Japan .................... 426/631
61-56971  12/1986 Japan .
2022562   1/1987  Japan .................... 426/602
62-163658 7/1987  Japan .
63-192344 8/1988  Japan .
8152467   9/1988  Japan .................... 426/602
249452    10/1990 Japan .

OTHER PUBLICATIONS

Morgan, J., 1982, "Chocolate and Candy Cookbook", Arco Publishing Inc., New York, pp. 152-154.
Derwent File Supplier Japs, accession No. 89-209243 [29], Patent Office of Japan, Tokyo, JP; & JP-A-1 144 934 (Fuji Oil Co.) * Abstract *.
Derwent File Supplier Japs, accession No. 87-239712 [U], Patent Office of Japan, Tokyo, JP; & JP-A-62 163 658 (Kanegafuchi Chem. Ind.).

Primary Examiner—Carolyn Paden
Attorney, Agent, or Firm—Wenderoth, Lind & Ponack

[57] ABSTRACT

A process for producing water-containing chocolate by admixing a chocolate mix subjected to rolling and conching according to the conventional method and an aqueous ingredient in the presence of a nut paste, or sugar fatty ester having a low HLB such as 1 to 3 the main constituent fatty acid of which is that having 20 to 26 carbon atoms to emulsify the mixture into a water-in-oil type one is disclosed.

5 Claims, No Drawings

PROCESS FOR PRODUCING WATER-CONTAINING CHOCOLATE

FIELD OF THE INVENTION

The present invention relates to a process for producing water-containing chocolate. More particularly, it relates to a process for producing water-containing chocolate having good taste and an extremely stable emulsion state in comparison with conventional "ganache". The water-containing chocolate of the present invention can be advantageously used for coatings of ice cream and the like as well as solid products such as chocolate bar.

BACKGROUND OF THE INVENTION

Ganache is produced by admixing a chocolate mix and cream. It is an oil-in-water type emulsion and is used for a raw material of high grade confectionery. However, when ganache solidified by cooling is agitated with heating in a water bath so as to soften it upon use, a change of its emulsion state is often experienced. Thus, conventional ganache has a disadvantage that, if its water content changes even by only a little (even scattering of water), the emulsion state is broken to cause separation.

Besides, since ganache uses a chocolate mix subjected to a rolling and conching processes, it has a good taste. Further, since ganache is an oil-in-water type emulsion, it is soft and has good melting in the mouth. However, it has another disadvantage that, when ganache is used as coating materials, it is hard to dry and sticks to a wrapping paper.

On the other hand, processes for producing fats and oils for icing, or an emulsion type cake icing by kneading a fat ingredient, a chocolate ingredient such as cocoa, cocoa butter, etc. and an aqueous ingredient such as fresh cream with rapid cooling have been proposed (Japanese Patent Kokai Nos. 50-46868 and 51-32765). However, in these processes, since the chocolate ingredient is not subjected to a rolling or conching treatment, there is a disadvantage in that taste of the chocolate ingredient is inferior in comparison with ganache. Further, even if these processes are employed, there is a disadvantage that an the emulsion state of a product of the processes is unstable and, when the product solidified by cooling is melted with heating upon use, separation of the ingredient is caused. In addition to the above processes, a process for producing chocolate for ice coating which comprise mixing fats and oils containing soybean lecithin with cocoa and sugar, subjecting the mixture to rolling and conching treatment according to the conventional manner to obtain a chocolate mix and stirring the chocolate mix with liquid sugar containing powdered lecithin with a propeller mixer to emulsify the mixture is also known (Japanese Patent Kokai No. 51-106763). However, such a process has also a disadvantage that the emulsion state of a product obtained is unstable and the fat ingredient is separated by repetition of solidification with cooling and melting with heating.

OBJECTS OF THE INVENTION

The main object of the present invention is to minimize the above disadvantages in ganache and similar products by the known processes.

That is, one object of the present invention is to provide a process for producing water-containing chocolate having a good taste like ganache. The water-containing chocolate of the present invention dries quickly upon coating of food, such as ice cream at a low temperature. It is a water-in-oil type emulsion and causes no breakage of emulsification even by repetition of solidification with cooling and melting with heating.

Another object of the present invention is to provide a process for producing water-containing chocolates having good taste, which can be used for solid products such as chocolate bars.

These objects as well as other objects and advantages of the present invention will become apparent to those skilled in the art from the following description.

SUMMARY OF THE INVENTION

In order to solve the above disadvantages, the present inventors have studied intensively. As a result, the present inventors have succeeded in the production of a stable water-in-oil type emulsion by mixing chocolate with a suitable amount of water in the presence of a nut paste, or a certain emulsifying agent.

That is, according to the present invention, there is provided a process for producing water-containing chocolate which comprises admixing a chocolate mix subjected to rolling and conching according to the conventional manner and an aqueous ingredient in the presence of a nut paste to emulsify the mixture into a water-in-oil type emulsion.

The present invention also provides a process for producing water-containing chocolate which comprises admixing a chocolate mix subjected to rolling and conching according to the conventional manner and an aqueous ingredient in the presence of a sugar fatty ester having a low HLB, the main constituent fatty acid of which is one having 20 to 26 carbon atoms, to emulsify the mixture into a water-in oil type emulsion.

DETAILED DESCRIPTION OF THE INVENTION

In the present invention, as the chocolate mix for example, there can be used a chocolate mix obtained by using one or more materials selected from cacao mass, cocoa powder, cocoa butter, etc. and subjecting them to rolling and conching according to the conventional manner, in addition to the conventional chocolates including commercially available sweet chocolate, milk chocolate and the like. Preferably, the chocolate mix is obtained by using cocoa and/or cacao mass, sugar and fats and oils as the main ingredients and subjecting them to rolling and conching according to the conventional manner. By conducting such a treatment, the resulting product has a mellow chocolate taste. In addition, in the present invention, water-containing chocolate which is similar to white ganache can be obtained by using cocoa butter or vegetable fats and oils together with solid materials such as sugar, whole milk powder, skim milk powder or the like without using cocoa or cacao mass. Further, water-containing chocolates having various tastes and colors can be produced by using flavoring materials such as coffee, fruits, etc.

As the aqueous ingredient, for example, there are can be used water, liquid sugar, natural cream, milk, cream using various animal and vegetable fats and oils which have been developed heretofore, condensed milk or various fruits, juice, natural honey, liquors and the like. They can be used alone or in combination thereof. In the present invention, the aqueous ingredient is mixed in an amount that the water content of the water-containing chocolate becomes 3 to 30% by weight based on the total weight of the chocolate. Even when the water content is lower than the lower limit, the resulting product becoming a water-in-oil type emulsion. However, its viscosity becomes too high and, therefore, workability is impaired. On the other hand, when the water content exceeds the upper limit, the resulting product tends to become an oil-in-water emulsion. In the case of the production of a solid product such as chocolate bar, it is preferred that the water ingredient is mixed in an amount that the water content of the chocolate becomes about 3 to 10% by weight.

The nut paste is used in an amount of 3 to 30% by weight, preferably 5 to 10% by weight based on the total weight of the water-containing chocolate. Preferably, the nut paste is prepared from roasted nuts having a low degree of roasting. When the degree of roasting is high, the nuts per se are colored and a specific odor of nuts is produced. This is not preferred. However, it is possible to change a colored nut paste having the specific odor to a paste suitable for the present invention by decoloring and deodorization. Examples of the nuts include pistachio nut, brazil nut, hazelnut, peanut, cashew nut, almond, walnut and the like. Defatted nuts can also be used. By using the nut paste, the water-containing chocolate which is suitable for a solid product such as chocolate bar as well as coatings can be obtained.

In addition to the nut paste, one or more conventional emulsifying agents are used. Examples of the emulsifying agents include lecithin, glycerin fatty acid ester, propylene glycol fatty acid ester, sucrose fatty acid ester, polyglycerin fatty acid ester, polyglycerin condensed ricinolate ester and the like. These emulsifying agents can be used in an amount of 0.1 to 2% by weight based on the water-containing chocolate. In the case of producing a solid chocolate, it is preferable to use lecithin together with polyglycerin condensed ricinolate ester.

Instead of the nut paste, the sugar fatty ester is used as a emulsifying agent in the present invention to produce the water-containing chocolate suitable for coatings and solid products. The sugar fatty ester is that having a low HLB the main constituent fatty acid (e.g., at least 60% of the constituent fatty acids) of which is that having 20 to 26 carbon atoms. Preferably, the HLB thereof is about 1 to 3. As the fatty acid ester, behenic acid ester (ester of the saturated fatty acid having 22 carbon atoms) and erucic acid ester (ester of the unsaturated fatty acid having 22 carbon atoms) are preferred. If the main constituent fatty acid is other than the above, any desired effect can not be expected. These sugar fatty esters can be used alone or in combination thereof. When using the sugar fatty ester, one or more other conventional emulsifying agents can be used. Examples thereof include lecithin, glycerin fatty acid ester, propylene glycol fatty acid ester, other sucrose fatty acid ester, polyglycerin fatty acid ester and the like. In many cases, lecithin is derived from the chocolate mix used. The sugar fatty ester having low HLB is used in an amount that the total of the emulsifying agents used becomes 0.1 to 2% by weight based on the water-containing chocolate.

Use of the nut paste or the sugar fatty ester having low HLB minimizes the influence of agitating during the production on the emulsion system. Further, they have excellent effect on maintaining stability of the water-in-oil type emulsion system once formed. And, when the nut paste is used, it is possible to use a deposit and bring about properties suitable for continuous mechanical treatment. Furthermore, even if the water-in-oil type emulsion system once formed is agitated with heating again, not only separation of the fat ingredient is prevented, but also phase conversion from a water-in-oil type emulsion to an oil-in-water type emulsion hardly takes place.

That is, normally, when chocolate is mixed with fresh cream, the resulting mixture is not emulsified, but the aqueous ingredient, the fat ingredient and solid materials are merely dispersed. Therefore, when the mixture is heated and allowed to stand in a melted state, the aqueous ingredient and the fat ingredient agglomerate with time, respectively. It is considered that conventional ganache is in such an unstable dispersion state. On the other hand, according to the present invention, a water-in-oil type emulsion having sufficient stability can be obtained by using one or more conventional emulsifying agents such as lecithin, glycerin fatty acid ester, sucrose fatty acid ester, propylene glycol fatty acid ester and polyglycerin fatty acid ester together with the above nut paste. Further, the solid product such as chocolate bar can be obtained by using lecithin and polyglycerin condensed ricinolate ester are used together with the nut paste. Furthermore, when the above sugar fatty ester having low HLB is used, a water-in-oil type emulsion which has not been obtained by using conventional emulsifying agents such as lecithin, glycerin fatty acid ester, propylene glycol fatty acid ester and polyglycerin fatty acid ester can be obtained. Particularly, when only polyglycerin condensed ricinolate ester or sorbitan fatty acid ester is used, an emulsion tends to become an oil-in-water type emulsion. However, when the above sugar fatty ester having low HLB is used, the stable water-in-oil emulsion can be obtained. This has never been found in the prior art.

In order to conduct the process of the present invention, firstly, the chocolate mix subjected to rolling and conching according to the conventional manner is melted with heating and, in the case of using the nut paste, the paste is added thereto. After mixing, the aqueous ingredient such as cream, etc. heated to the same temperature is further added to the resulting mixture and it is emulsified in the presence of emulsifying agents including the above sugar fatty ester having low HLB, if it is used, to obtain a water-in-oil type emulsion. The emulsifying agents may be added in the chocolate mix in advance. Means for emulsification are not limited to a specific one, but it is preferred to uniformly mix with stirring both ingredients as soon as possible, after they are admixed. If no emulsifying agent is used, the resulting emulsion becomes an oil-in-water type emulsion. The determination whether the resulting emulsion product is a water-in-oil type or an oil-in-water type can be readily conducted by observing the emulsion under a microscope. Further, it can be easily confirmed by applying an electric current to the emulsion product. When electricity passes through, it is an oil-in-water type emulsion and, when no electricity passes through, it is a water-in-oil type emulsion. In fact, when the water-containing chocolate obtained according to the present invention is observed under a microscope, it is confirmed that the fat phase is a continuous phase and fine water droplet particles are dispersed therein in a dense state.

In the present invention, other additives such as phosphate salts, gums, sugars and the like may be suitably added, in addition to the above raw materials.

When the water-containing chocolate of the present invention are used for coating of ice cream products, e.g., ice cream bar etc., the drying time is extremely short in comparison with conventional ganache and, even if solidification by cooling and melting by heating are repeated, the emulsified state is extremely stable and the water-in-oil type emulsion state can be maintained. Thus, the water-containing chocolate of the present invention can be advantageously used for coating of ice cream and, further, it can be dispersed in ice cream in the shape of chunks and chips, or can be used as center materials for ice cream, or can be used for the production of marble-like ice cream by using together with ice cream. Furthermore, it can be advantageously used for the production of novel praline type ice cream in which ice cream is filled in a cup-shaped or ball-shaped shell. In addition to the above ice cream products, water-containing chocolate can be used as a long-life shell center material by adjustment of the water content, or used as chocolate bar, molded chocolate chip having a low water content and the like. Further, various chocolates such as chip chocolates, kiss chocolates, sheet chocolates and the like can be produced from the water-containing chocolate by whipping and molding.

As described above, according to the present invention, it becomes possible to produce water-in-oil type water-containing chocolate having an extreme stable emulsion state without causing separation of a fat ingredient, even if solidification with cooling and melting with heating are repeated.

Further, according to the present invention, the drying time can be reduced in the case of using for coatings of ice cream products, cakes, etc. in comparison with conventional ganache, and it became possible to produce solid chocolate such as chocolate bar having various good tastes.

The following Examples and Comparative Examples further illustrate the present invention in detail but are not to be construed to limit the scope thereof. In the Examples and Comparative Examples, all "parts" and "percents" are by weight unless otherwise stated.

EXAMPLE 1

A commercially available milk chocolate (55 parts) having a fat content of 40% was heated to about 50° C. and to this was added a peanut paste (15 parts) having particle size of about 20μ roasted at a low temperature with preventing coloring. After thoroughly mixing, a commercially available fresh cream (30 parts) having a fat content of about 45% heated to about 50° C. was added. The resulting mixture was uniformly mixed to obtain water-containing chocolate having a fat content of 43% and a water content of 14%.

By applying an electric current to the water-containing chocolate thus obtained, the emulsion type was confirmed to be a water-in-oil type emulsion.

The resulting water-containing chocolate was heated to 40° C. and a commercially available ice cream bar was dipped therein and then the bar was immediately pulled up. As a result, the coverage weight was 10 g and chocolate on the coating surface dried within one minute to such a degree that it did not stick to the hand. When water-containing chocolate was melted with heating after it was solidified by cooling and this operation was repeated five times, the emulsion state was good and no separation of the fat ingredient was observed.

EXAMPLE 2

Sweet chocolate

Chocolate having a fat content of 49% was produced from cocoa mass (29 parts), sugar (38 parts), cocoa butter (7 parts) and a vegetable fat (26 parts) by rolling and conching according to the conventional method. The resulting chocolate (50 parts) was heated to about 45° C. and to this was added the same peanut paste (10 parts) as that described in Example 1. After mixing, a commercially available fresh cream (40 parts) having a fat content of 40% heated to about 45° C. was added. The resulting mixture was uniformly mixed to obtain water-containing chocolate having a fat content of 47.4% and a water content of 19.2%.

By applying an electric current to the water-containing chocolate thus obtained, the emulsion type was confirmed to be a water-in-oil type emulsion.

The resulting water-containing chocolate was heated to 40° C. and a commercially available ice cream bar was dipped therein and then the bar was immediately pulled up. As a result, the coverage weight was 8 g and chocolate on the coating surface dried within one minute to such a degree that it did not stick to the hand. When water-containing chocolate was melted with heating after it was solidified with cooling and this operation was repeated five times and, the emulsion state was good and no separation of the fat ingredient was observed.

EXAMPLE 3

Milk chocolate

Chocolate having a fat content of 48% was produced from cocoa mass (17 parts), whole milk powder (9 parts), sugar (38 parts), cocoa butter (13 parts) and a vegetable fat (23 parts) by rolling and conching according to the conventional method. The resulting chocolate (70 parts) was heated to about 45° C. and to this was added a cashew nut paste (10 parts) having particle size of about 20μ roasted at a low temperature at which its color slightly changed to light yellow. After mixing, a commercially available fresh cream (30 parts) having a fat content of 40% heated to about 30° C. was added and the mixture was uniformly mixed to obtain water-containing chocolate having a fat content of 47.1% and a water content of 14.4%.

By applying an electric current to the water-containing chocolate thus obtained, the emulsion type was confirmed to be a water-in-oil type emulsion. When water-containing chocolate was melted with heating after it was solidified with cooling and this operation was repeated five times, the emulsion state was good and no separation of the fat ingredient was observed.

EXAMPLE 4

Sweet chocolate

Chocolate having a fat content of 36% was produced from cocoa mass (39 parts), sugar (46 parts), cocoa butter (9 parts) and a vegetable fat (6 parts), chocolate according to the conventional method. The resulting chocolate (80 parts) was heated to about 45° C. and to this was added the same cashew nut paste (5 parts) as that described in Example 3. After mixing, a commercially available fresh cream (15 parts) having a fat content of 45% heated to about 30° C. was further added. The mixture was uniformly mixed to obtain water-containing chocolate having a fat content of 38.1% and a water content of 7.2%.

By applying an electric current to the water-containing chocolate thus obtained, the emulsion type was confirmed to be a water-in-oil type emulsion. When the water-containing chocolate was melted with heating after it was solidified with cooling and this operation was repeated three times, the emulsion state was good and no separation of the fat ingredient was observed. The water-containing chocolate could be molded after tempering. Further, it could be used for a center material of shell chocolate.

EXAMPLE 5

White chocolate

Chocolate having a fat content of 50% was produced from whole milk powder (20 parts), sugar (35 parts), cocoa butter (19 parts) and a vegetable fat (26 parts) according to the conventional method. The resulting chocolate (90 parts) was heated to about 45° C. and to this was added the same cashew nut paste (15 parts) as that described in Example 3. After mixing, a commercially available fresh cream (10 parts) having a fat content of 45% heated to about 30° C. was added. The mixture was uniformly mixed to obtain water-containing chocolate having a fat content of 49.5% and a water content of 4.8%.

By applying an electric current to the water-containing chocolate thus obtained, the emulsion type was confirmed to be a was water-in-oil type emulsion.

EXAMPLE 6

Commercially available chocolate (40 parts) having a fat content of 52% was heated to about 45° C. and to this was added the same peanut paste (20 parts) as that described in Example 1. After mixing, a commercially available fresh cream (40 parts) having a fat content of about 47.5% heated to about 30° C. was further added. The mixture was uniformly mixed to obtain water-containing chocolate having a fat content of 49.8% and a water content of 19.2%.

By applying an electric current to the water-containing chocolate thus obtained, the emulsion type was confirmed to be a water-in-oil type emulsion. When the resulting water-containing chocolate was melted with heating after it was solidified with cooling and this operation was repeated five times, the emulsion state was good and no separation of the fat ingredient was observed.

EXAMPLE 7

Deodorizing treatment of nuts

By using a known apparatus for deodorizing fats and oils, a mixture of cashew nut paste (50 parts) and a vegetable fat (50 parts) was subjected to vapor deodorization at 100° C. for one hour.

White chocolate

Chocolate having a fat content of 52% was produced from whole milk powder (20 parts), sugar (33 parts), cocoa butter (20 parts) and a vegetable fat (27 parts) according to the conventional method. The resulting chocolate (60 parts) was heated to about 50° C. and to this was added a mixture (particle size: about 20μ; 10 parts) of cashew nut paste and fat subjected to the above deodorization treatment. After mixing, a commercially available fresh cream (45 parts) having a fat content of about 45% heated to about 50° C. was added. The mixture was uniformly mixed to obtain water-containing chocolate having a fat content of 2.2% and a water content of 14.4%, which has good taste and flavor and no nut odor.

By applying an electric current to the water-containing chocolate thus obtained, the emulsion type was confirmed to be a water-in-oil type emulsion.

The resulting water-containing chocolate was heated to 40° C. and a commercially available ice cream bar was dipped therein and then the bar was immediately pulled up. As a result, the coverage weight was 12 g and chocolate on the coating surface dried for one minute to such a degree that it did not stick to the hand. When, water-containing chocolate was melted with heating after it was solidified with cooling and this operation was repeated three times and, the emulsion state was good and no separation of the fat ingredient was observed.

EXAMPLE 8

White chocolate

Chocolate having a fat content of 53.8% was produced from the same cashew nuts (15 parts) as that used in Example 3, whole milk powder (5 parts), sugar (35 parts), cocoa butter (20 parts) and a vegetable fat (25 parts) by rolling and conching according to the conventional method. The resulting chocolate (70 parts) was heated to about 45° C. and to this was added a commercially available fresh cream (45 parts) having a fat content of 45% heated to about 50° C. The mixture was uniformly mixed to obtain water-containing chocolate having a fat content of 51% and a water content of 14.4%.

By applying an electric current to the water-containing chocolate thus obtained, the emulsion type was confirmed to be a water-in-oil type emulsion.

EXAMPLE 9

Chocolate having a fat content of 36.7% was produced from whole milk powder (18 parts), sugar (8 parts), cocoa butter (18 parts), a vegetable fat (10 parts) and the same cashew nuts paste (8 parts) as that used in Example 3, by rolling and conching according to the conventional method. To the resulting chocolate (80 parts) was added a vegetable fat (20 parts). After the mixture was melted at 45° C., it was cooled and subjected to tempering. To this was added concentrated orange juice (about 20 parts) having a sugar content of 50% (50° Brix) at about 30° C. to obtain water-containing chocolate having a fat content of 41.1% and a water content of 8.3%.

The emulsion type of the resulting water-containing chocolate was confirmed to be a was water-in-oil type emulsion.

The water-containing chocolate mix was cast in a chocolate mold, cooled at 10° C. for 25 minutes, released from the mold to obtain a chocolate bar. When the resulting water-containing chocolate was allowed to stand at room temperature of 20° C. for about 6 months, no change was observed in taste and color. Water activity of the water-containing chocolate was measured. As a result, water activity was 0.71. Therefore, it was found that quality of the chocolate was hardly influenced by microorganisms.

EXAMPLE 10

White chocolate

Chocolate having a fat content of 36.7% was produced from whole milk powder (18 parts), sugar (8 parts), cocoa butter (18 parts) a vegetable fat (10 parts) and the same cashew nuts paste (8 parts) as that used in Example 3. To the resulting chocolate (80 parts) was added a vegetable fat (20 parts). After the mixture was melted at 45° C., it was cooled and subjected to tempering. To this was added concentrated orange juice (about 20 parts) having a sugar content of 50% (50° Brix) at about 30° C. and orange liqueur (5 parts) of 40 proof was further added to obtain water-containing chocolate having a fat content of 39.5% and a water content of 8.0%.

The emulsion type of the resulting water-containing chocolate was confirmed to be a water-in-oil type emulsion.

The water-containing chocolate mix was cast in a chocolate mold, cooled at 10° C. for 25 minutes, released from the mold to obtain a chocolate bar.

EXAMPLE 11

A commercially available milk chocolate (60 parts) with a fat and oil content of 38% was heated to about 45° C. and to this was added sucrose fatty acid ester of HLB 2 (10 parts, main constituent fatty acid: erucic acid). After mixing, a commercially available fresh cream (40 parts) having a fat content of 45% heated to about 30° C. was added. The mixture was uniformly mixed to obtain water-containing chocolate having a fat content of 40.8% and a water content of 19%.

By applying an electric current to the water-containing chocolate thus obtained, the emulsion type was confirmed to be a water-in-oil type emulsion.

The resulting water-containing chocolate was heated to 40° C. and a commercially available ice cream bar was dipped therein and then the bar was immediately pulled up. As a result, the coverage weight was 10 g and chocolate on the coating surface dried within one minute to such a degree that it did not stick to the hand. When water-containing chocolate was melted with heating after it was solidified with cooling and this operation was repeated five times, the emulsion state was good and no separation of the fat ingredient was observed.

COMPARATIVE EXAMPLE 1

According to the same manner as that described in Example 1, water-containing chocolate was produced except that no sucrose fatty acid ester was used. The emulsion type of the resulting water-containing chocolate was an oil-in-water type emulsion and water content was 19%. An ice cream bar was coated with the resulting water-containing chocolate according to the same manner as that in Example 11. As a result, the coverage weight was 20 g, but chocolate was not solidified at all and it sticked to the hand even after five minutes. However, a normal ice-coating chocolate was solidified within two minutes at latest. Further, when the resulting water-containing chocolate was melted with heating after it was solidified with cooling, the emulsion state was changed and separation of the fat ingredient was observed.

EXAMPLE 12

Sweet chocolate

Chocolate having a fat content of 49% was produced from cocoa mass (29 parts), sugar (38 parts), cocoa butter (7 parts) and a vegetable fat (26 parts) by rolling and conching according to the conventional method. The resulting chocolate (60 parts) was heated to about 45° C. and to this was added sucrose fatty acid ester of HLB 2 (1 part, main constituent fatty acid: erucic acid). After mixing, a commercially available fresh cream (40 parts) with a fat content of about 45% heated to about 30° C. was added. The mixture was uniformly mixed to obtain water-containing chocolate having a fat content of 47.4% and a water content of 19.2%.

By applying an electric current to the water-containing chocolate thus obtained, the emulsion type was confirmed to be a water-in-oil type emulsion.

The resulting water-containing chocolate was heated to 40° C. and a commercially available ice cream bar was dipped therein and then the bar was immediately pulled up. As a result, the coverage weight was 10 g and chocolate on the coating surface dried within one minute to such a degree that it did not stick to the hand. When the water-containing chocolate was melted with heating after it was solidified with cooling and this operation was repeated five times, the emulsion state was good and no separation of the fat ingredient was observed.

EXAMPLE 13

Milk chocolate

Chocolate having a fat content of 48% was produced from cocoa mass (17 parts), whole milk powder (9 parts), sugar (38 parts), cocoa butter (13 parts) and a vegetable fat (23 part) by rolling and conching according to the conventional method. The resulting chocolate (70 parts) was heated to about 45° C. and to this was added sucrose fatty acid ester of HLB 2 (1 part, main constituent fatty acid: erucic acid). After mixing, a commercially available fresh cream (30 parts) having a fat content of about 45% heated to about 30° C. was further added. The mixture was uniformly mixed to obtain water-containing chocolate having a fat content of 47.1% and a water content of 14.4%.

By applying an electric current to the water-containing chocolate thus obtained, the emulsion type was confirmed to be a water-in-oil type emulsion. When water-containing chocolate was melted with heating after it was solidified with cooling and this operation was repeated five times, the emulsion state was good and no separation of the fat ingredient was observed.

EXAMPLE 14

Sweet chocolate

Chocolate having a fat content of 36% was produced from cocoa mass (39 parts), sugar (46 parts), cocoa butter (9 parts) and a vegetable fat (6 parts) according to the conventional method. The resulting chocolate (85 parts) was heated to about 45° C. and to this was added sucrose fatty acid ester of HLB 2 (1 part, main constituent fatty acid: erucic acid). After mixing, a commercially available fresh cream (15 parts) having a fat content of about 45% heated to about 30° C. was further added. The mixture was uniformly mixed to obtain water-containing chocolate having a fat content of 37.4% and a water content of 7.2%.

By applying an electric current to the water-containing chocolate thus obtained, the emulsion type was confirmed to be a water-in-oil type emulsion. When the water-containing chocolate was melted with heating after it was solidified with cooling and this operation was repeated three times and, the emulsion state was good and no separation of the fat ingredient was observed. The resulting water-containing chocolate could be molded after tempering as well as it could be used as a center material for shell chocolate.

EXAMPLE 15

White chocolate

Chocolate having a fat content of 50% was produced from whole milk powder (20 parts), sugar (35 parts), cocoa butter (19 parts) and a vegetable fat (26 parts) according to the conventional method. The resulting chocolate (90 parts) was heated to about 45° C. and to this was added sucrose fatty acid ester of HLB 2 (1 part, main constituent fatty acid: erucic acid). After mixing, a commercially available fresh cream (15 parts) having a fat content of about 45% heated to about 30° C. was added. The mixture was uniformly mixed to obtain water-containing chocolate having a fat content of 49.5% and a water content of 4.8%.

By applying an electric current to the water-containing chocolate thus obtained, the emulsion type was confirmed to be a was water-in-oil type emulsion.

EXAMPLE 16

Commercially available chocolate (60 parts) having a fat content of 52% was heated to about 45° C. and to this was added sucrose fatty acid ester of HLB 2 (1 part, main constituent fatty acid: erucic acid). After mixing, a commercially available fresh cream (40 parts) having a fat content of about 47.5% heated to about 30° C. was further added. The mixture was uniformly mixed to obtain water-containing chocolate having a fat content of 50.2% and a water content of 19.2%.

By applying an electric current to the water-containing chocolate thus obtained, the emulsion type was confirmed to be a was water-in-oil type emulsion. When the water-containing chocolate was melted with heating after it was solidified with cooling and this operation was repeated five times, the emulsion state was good and no separation of the fat ingredient was observed.

COMPARATIVE EXAMPLE 2

According to the same manner as that described in Example 16, water-containing chocolate was produced except that sucrose fatty acid ester of HLB 2 the main constituent fatty acid was oleic acid was used in place of the sucrose fatty acid ester of HLB 2 of erucic acid. The water content of the resulting water-containing chocolate was 19% and it was the same as that in Example 16. However, when applying an electric current, it was found that the emulsion type of the water-containing chocolate was a mixture of a water-in-oil type and an oil-in-water type emulsions and was unstable. When the resulting water-containing chocolate was melted with heating after it was solidified with cooling, the emulsion state was changed and separation of the fat ingredient was observed. Further, its taste was inferior because of a strong taste of the emulsifying agent.

What is claimed is:

1. A process for producing water-containing chocolate which comprises directly mixing a chocolate mix, which has been subjected to rolling and conching, with an aqueous ingredient in the presence of a nut paste to emulsify the mixture into a water-in-oil type emulsion, said chocolate mix being a mix comprising cocoa, cacao mass or a mixture of cocoa and cacao mass, and sugar and fates and oils, or a mix comprising cocoa butter of vegetable fats and oils, sugar and whole milk powder or skim milk powder without cocoa or cacao mass and wherein said aqueous ingredient is a material selected from the group consisting of water, liquid sugar, cream, milk, condensed milk, juices, honey, liquors and mixtures thereof; said aqueous ingredient containing 3 to 30% by weight of water based upon the total weight of the mixture.

2. A process according to claim 1, wherein the nut paste is used in an amount of 3 to 30% by weight based on the total weight of the water-containing chocolate.

3. A process for producing water-containing chocolate which comprises directly mixing a chocolate mix, which has been subjected to rolling and conching, with an aqueous ingredient in the presence of a sugar fatty ester having a low HLB, the main constituent fatty acid of which is that having 20 to 26 carbon atoms, to emulsify the mixture into a water-in-oil type emulsion, said chocolate mix being a mix comprising cocoa, cacao mass or a mixture of cocoa and cacao mass, and sugar and fats and oils, or a mix comprising cocoa butter or vegetable fats and oils, sugar and whole milk powder or skim milk powder without cocoa or cacao mass and wherein said aqueous ingredient is a material selected from the group consisting of water, liquid sugar, cream, milk, condensed milk, juices, honey, liquors and mixtures thereof; said aqueous ingredient containing 3 to 30% by weight of water, based upon the total weight of the mixture.

4. A process according to claim 3, wherein HLB of the sugar fatty ester is 1 to 3.

5. A process according to claim 3, wherein the sugar fatty ester is used in an amount that the total of emulsifying agent used becomes 0.1 to 2% by weight based on the weight of the water-containing chocolate.

* * * * *